United States Patent [19]
Best et al.

[11] Patent Number: 5,776,287
[45] Date of Patent: Jul. 7, 1998

[54] COUPON MANUFACTURING MACHINE

[75] Inventors: Scott D. Best, Troy; James F. Turner, Farmington Hills, both of Mich.

[73] Assignee: Saxon Incorporated, Ferndale, Mich.

[21] Appl. No.: 733,801

[22] Filed: Oct. 18, 1996

[51] Int. Cl.⁶ .................... B32B 31/08; B32B 31/18
[52] U.S. Cl. .............. 156/260; 156/249; 156/267;
156/271; 156/277; 156/324; 156/387; 156/512;
156/543; 283/51
[58] Field of Search ...................... 156/249, 259,
156/260, 267, 269, 277, 271, 361, 387,
510, 512, 554, 324, 543; 283/51, 107

[56] References Cited

U.S. PATENT DOCUMENTS

| | | |
|---|---|---|
| 5,021,110 | 6/1991 | Kobayashi . |
| 5,106,124 | 4/1992 | Volkman et al. . |
| 5,143,466 | 9/1992 | Baldwin et al. . |
| 5,299,834 | 4/1994 | Kraige ........................ 283/51 |
| 5,308,120 | 5/1994 | Thompson ............... 283/51 X |
| 5,417,458 | 5/1995 | Best et al. . |
| 5,466,321 | 11/1995 | Miyaji . |
| 5,571,358 | 11/1996 | Napier et al. ............. 156/277 X |

*Primary Examiner*—Curtis Mayes
*Attorney, Agent, or Firm*—Howard & Howard

[57] ABSTRACT

A coupon manufacturing machine assembly (10) for producing a two-sided coupon card (78). The coupon card (78) is fabricated from a continuous sheet of stock (26) wherein the sheet of stock (26) has an adhesive layer (30) and a release film (32) applied to a bottom surface (34). A printing station (12) prints indicia on a top surface (36) of the continuous sheet of stock (26) in two parallel rows. The two parallel rows define a first strip (38) and a second strip (40) of the stock (26). A laminating device (14) applies a clear laminate (46) to the top surface (36) of the stock (26) for viewing the indicia. A cutting device (16) separates the continuous sheet of stock (26) into the first strip (38) and the second strip (40) and an inverting device (18) rotates the second strip (40) 180° relative to the first strip (38). More specifically, the second strip (40) passes through a first turn bar (52), a spacing roller (58), and then through a second turn bar (54) to effectuate the 180° rotation. A stripping device (20) removes the release film (32) from the first strip (38) to expose the adhesive layer (30). The adhesive layer (30) of the first strip (38) is moved into a bonded relationship with the release film (32) of the second strip (40). Specifically, a coupling device (22) mates and adheres the adhesive layer (30) of the first strip (38) with the release film (32) of the second strip (40) to form a series of two-sided coupon cards (78) with the indicia printed on both sides thereof.

26 Claims, 6 Drawing Sheets

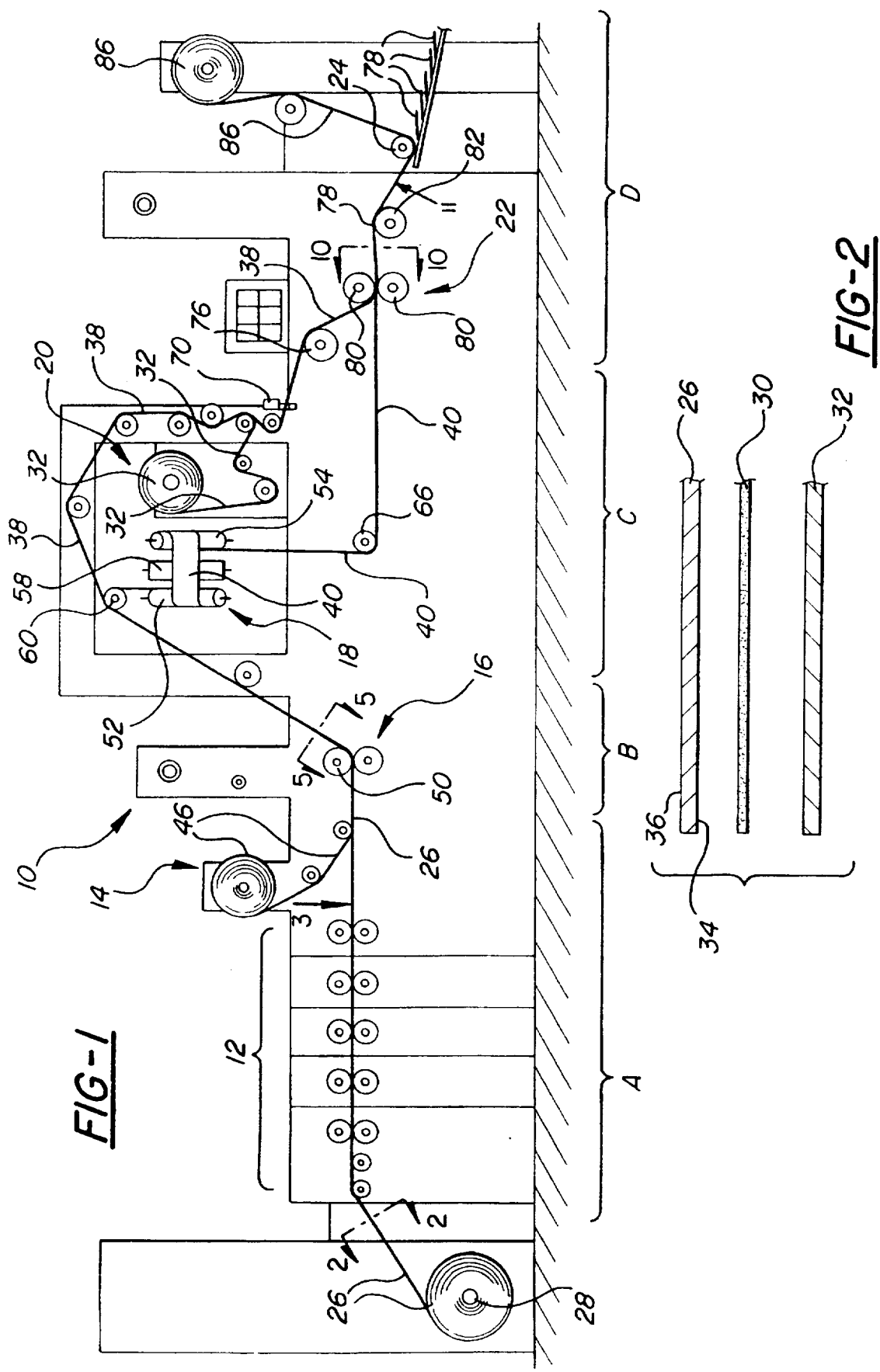

COUPON MANUFACTURING MACHINE

TECHNICAL FIELD

The subject invention relates to a coupon manufacturing machine assembly that produces a series of two-sided coupon cards from a continuous sheet of stock.

BACKGROUND OF THE INVENTION

Multilayered labels or coupons and their manufacture are well known in the art. These multilayered labels have individual layers of card stock adhered on-top of one another. Each layer of card stock is printed with informational messages, advertisements, and/or coupons. The inner layer of card stock is typically attached to an article such as a beverage or food container. A user then peels the outer layer of card stock from the inner layer of card stock to expose a one time coupon.

A machine for manufacturing these multilayered coupons is disclosed in U.S. Pat. No. 5,021,110 to Kobayashi. The Kobayashi '110 patent discloses a label manufacturing machine that includes a sheet of a card stock having a clear film liner applied to a bottom surface thereof. The film liner is temporarily separated from the bottom surface of a first half of the card stock and the card stock enters into a preprinting area. A message is printed on the bottom surface of the first half and then the film liner is reapplied to that bottom surface. The card stock passes through a main printing area which imprints messages on the top surface of both the first and second halves in parallel and at the same time. The card stock is cut in half by a cutting wheel which separates the first and second halves. The film liner is removed from the first half by a peeling mechanism, which exposes the preprinted message and an adhesive layer. The second half passes through an adjustment mechanism which assists in aligning the first and second halves. The first and second halves subsequently mate and adhere together on-top of one another, thereby forming a number of multilayered labels. Specifically, the bottom surface of the first half, which has a message imprinted thereon and the adhesive layer exposed, mates with the top surface of the second half. The labels move into a finalizing area where a punching mechanism separates any exterior borders therefrom.

A similar machine for manufacturing multilayered coupons is disclosed in U.S. Pat. No. 5,466,321 to Miyaji. The label manufacturing machine disclosed in the Miyaji '321 patent utilizes a different adjustment mechanism for superposing a first half on-top of a second half to form a number of multilayered labels. Specifically, a bottom surface of the first half, which has an adhesive layer exposed, mates with a top surface of the second half.

The multilayered coupons discussed in the Kobayashi '110 and Miyaji '321 patents are intended to be attached to an article and are not designed for individual rise and transportation, i.e., used as a coupon that a user carries around in his/her wallet or purse. Once the outer layer of card stock or coupon is removed, the structure becomes a flimsy piece of film. In addition, these multilayered coupons do not have a any messages or coupons printed onto the back surface, i.e., the bottom surface of the second half. Hence, it is desirable to have a dual surface printed coupon that can retain its rigidity once a coupon or coupons are removed. In other words, a card that includes printed information or coupons on a top surface and also includes printed information or coupons on a bottom surface, whereby the coupons can be peeled off and redeemed.

Such a two-sided coupon card is disclosed in U.S. Pat. No. 5,417,459 to Best et al. and is assigned to the assignee of the subject invention. This two-sided coupon card comprises a first half and a second half. Both halves include a card stock with an adhesive layer and a film liner applied to a bottom surface and a laminate applied to a top surface. Typically, the first half has marketing information printed on the top surface thereof and the second half has a number of mini-coupons printed on the top surface thereof. The method of manufacturing these coupons comprises the following steps; printing information on a top surface of a card stock, whereby the top surface includes both a first and a second half; applying a laminate to the top surface; removing a film liner from a first half of the card stock to expose an adhesive layer; and folding the card stock in half such that the bottom surface of the first half is adhering to the bottom surface of the second half by the adhesive layer. The printing and laminating of the laminate are both done by a manufacturing machine. The removing of the film liner and folding of the card stock are accomplished by manually handling the coupon.

The amount of manual labor required to completely manufacture these two-sided coupon cards is very expensive and time consuming. Hence, there remains a need for a coupon manufacturing machine which produces a two-sided coupon card as discussed above without the manual handling of the coupon card.

SUMMARY OF THE INVENTION AND ADVANTAGES

A method of manufacturing a coupon card fabricated from a continuous sheet of stock having indicia printed on a top surface and covered by a clear laminate with an adhesive layer and a release film adhered to a bottom surface the method comprises the steps of: printing the indicia on the top surface of the continuous sheet of stock in two parallel rows that define a first strip and a second strip of the stock moving along a path; applying the clear laminate to the top surface of the stock for viewing the indicia; removing the release film from the first strip to expose the adhesive layer; and mating the adhesive layer of the bottom surface of the first strip with the release film of the bottom surface of the second strip to form a series of two-sided coupon cards with the indicia printed on both sides thereof; the method is characterized by the initiating being further defined as cutting the continuous sheet of stock between the first and second strips to separate the first and second strips and rotating one of the strips 180° relative to the other strip and moving the adhesive layer of the first strip into a bonded relationship with the release film of the second strip.

The subject invention also relates to a coupon manufacturing machine assembly for producing the coupon card fabricated from the continuous sheet of stock having indicia printed on the top surface and covered by the clear laminate with the adhesive layer and the release film adhered to the bottom surface. The assembly comprises a printing station for printing the indicia on the top surface of the continuous sheet of stock in two parallel rows that define the first strip and the second strip of the stock moving along the path. A laminating device applies the clear laminate to the top surface of the stock for viewing the indicia. A stripping device removes the release film from the first strip to expose the adhesive layer. A coupling device mates and adheres the adhesive layer of the bottom surface of the first strip with the release film of the bottom surface of the second strip to form the series of two-sided coupon cards with the indicia printed on both sides thereof. The assembly is characterized by a cutting device for separating the continuous sheet of stock into the first strip and the second strip and an inverting device for rotating one of the strips 180° relative to the other strip and moving the adhesive layer of the first strip into a bonded relationship with the release film of the second strip.

Accordingly, the subject invention provides a coupon manufacturing machine assembly that produces a series of two-sided coupon cards with indicia printed on both sides wherein any manual handling of the coupon card is eliminated.

BRIEF DESCRIPTION OF THE DRAWINGS

Other advantages of the present invention will be readily appreciated as the same becomes better understood by reference to the following detailed description when considered in connection with the accompanying figures wherein:

FIG. 1 is a schematic view of a manufacturing machine assembly of the subject invention;

FIG. 2 is an exploded cross-sectional view taken along line 2—2 of FIG. 1 showing the components is a spaced apart relationship;

DETAILED DESCRIPTION OF THE PREFERRED EMBODIMENT

Figure 3:
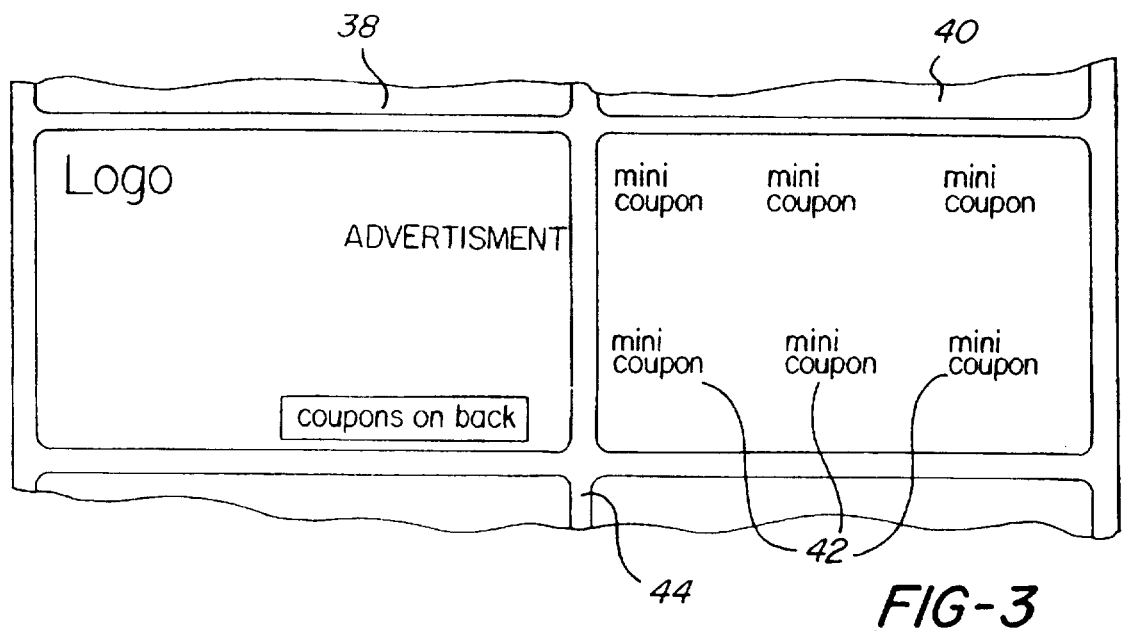
FIG. 3 is a fragmentary top view taken along line 3—3 of FIG. 1.

Referring to the Figures, wherein like numerals indicate like or corresponding parts throughout the several views, a coupon manufacturing machine assembly is generally shown at 10 in FIG. 1. The manufacturing machine assembly 10 may be divided into four separate sections. Section A includes a printing station 12 and a laminating device, generally shown at 14, section 13 includes a cutting device, generally shown at 16, section C includes an inverting device, generally shown at 18, and a stripping device, generally shown at 20, and section D includes a coupling device, generally shown at 22, and a punch wheel 24.

A rolled continuous sheet of stock 26 is mounted onto a rotating shalt 28 before the printing station 12 of section A. This continuous sheet of stock 26 is also known in the art as a web sheet. The sheet of stock 26 has an adhesive layer 30 and a release film 32 adhered to a bottom surface 34 thereof. The sheet of stock 26, adhesive layer 30, and release film 32 are shown in a spaced apart relationship in FIG. 2. The adhesive layer 30 also includes a silicone finish (not shown) that allows the release film 32 to be removed from the adhesive layer 30 without removing the adhesive 30 or damaging the sheet of stock 26. The continuous sheet of stock 26 if fed into the printing station 12 which prints indicia on a top surface 36 of the stock 26 in two parallel rows it the same time. Current printing stations 12 may consist of numerous Cyrel printing plates (not shown) as known to those skilled in the art. Variable speed laser printers may also be used as printing stations 12 without deviating from the scope of the subject invention. The length of the printing station 12 is dependent upon the number of colors used which in turn determines the number of printing plates or laser printers used.

As best shown in FIG. 3, the parallel rows define a first strip 38 and a second strip 40 of the stock 26 wherein these strips 38, 40 are continuously moving along a path. More specifically, the path is a longitudinal path that generally runs the lengthwise dimension of the manufacturing machine assembly 10. Commonly printed indicium comprises appropriate logo(s) and/or word(s) which may include manufacturing, marketing, charity information, and the like. The preferred embodiment of the subject invention includes marketing information printed on the first strip 38 and a number of mini-coupons 42 and other related information printed on the second strip 40. An un-printed line 44 separates the parallel printed messages on the first 38 and second 40 strips. As one skilled in the art can appreciate, any type or design of indicia may be printed on either the first 38 or second 40 strips without deviating from the scope of the subject invention. Further, the strips 38, 40 may be of any width and may be of equal widths as in the preferred embodiment or of unequal widths.

After the printing is completed the laminating device 14 applies a clear laminate 46 to the top surface 36 of the stock 26 for viewing the indicia. Specifically, the laminate 46 is a clear polyester laminate that is rolled onto a shelf above the continuous sheet of stock 26. The laminate 46 protects the top surface 36 of the stock 26 and ensures that the indicia will not smear, rub off, or otherwise be damaged.

Figure 4:
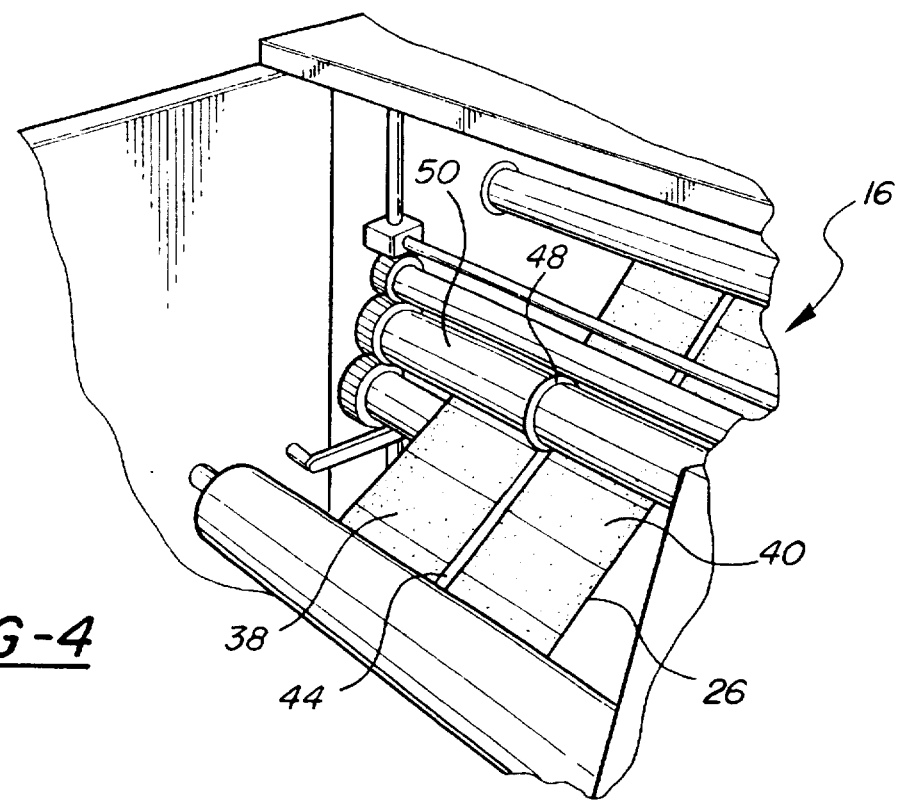
FIG. 4 is a fragmentary, perspective view of a cutting wheel.
Figure 5:
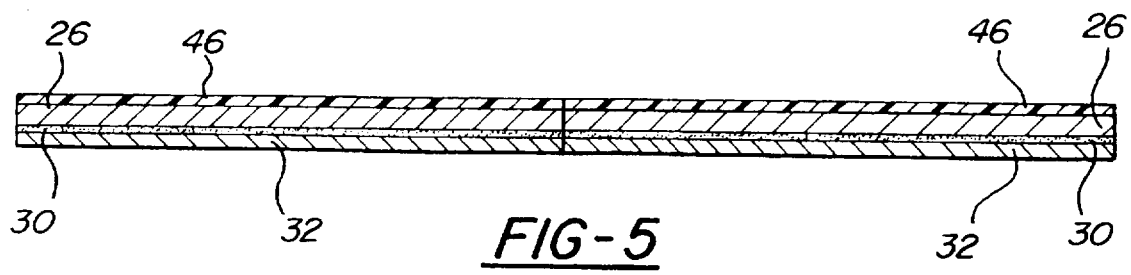
FIG. 5 is a cross-sectional view taken along line 5—5 of FIG. 1.

The continuous sheet of stock 26 then moves into section B where the cutting device 16 separates the continuous sheet of stock 26 into the first strip 38 and the second strip 40. As best shown in FIG. 4, the cutting device 16 comprises an annular blade 48 anchored to a cutting wheel 50. The sheet of stock 26 passes underneath the annular blade 48 wherein the annular blade 48 cuts through the sheet of stock 26 along the un-printed line 44 between the first 38 and second 40 strips. The strips 38, 40, however, remain in close proximity to each other. As best shown in FIG. 5, the first 38 and second 40 strips comprise the sheet of stock 26 with the adhesive layer 30 and the release film 32 applied to the bottom surface 34 and the laminate 46 applied to the top surface 36.

The continuous sheet of stock 26 then moves into section C where the first 38 and second 40 strips separate. The first strip 38 continues along the longitudinal path and passes over the second strip 40. In other words the first strip 38 runs the lengthwise dimension of the manufacturing machine assembly 10. The second strip 40 separates from the first strip 38 and passes into the inverting device 18. The inverting device 18 is shown schematically in FIG. 1 and more specifically in FIG. 6. Generally, the inverting device 18 rotates the second strip 40 180° relative to the first strip 38 and moves the adhesive layer 30 of the first strip 38 into a bonded relationship with the release film 32 of the second strip 40. As one skilled in the art can appreciate, either of the strips 38, 40 may be inverted without deviating from the scope of the subject invention.

The inverting device 18 includes a first turn bar 52 and a second turn bar 54 with a vertical axis 56 passing through an intersection of the first 52 and second 54 turn bars. Specifically, the first turn bar 52 is positioned at a first acute angle clockwise with respect to the vertical axis 56 and the second turn bar 54 is positioned at a second acute angle counterclockwise with respect to the vertical axis 56. More specifically, the sums of the first and the second acute angles equals 90°. In the preferred embodiment, the first turn bar 52 is positioned at a 45° angle clockwise with respect to the vertical axis 56 and the second turn bar 54 is positioned at a 45° angle counterclockwise with respect to the vertical axis 56. This embodiment creates the least amount of stress on the sheet of stock 26 as the stock 26 passes around the turn bars 52, 54. As known to those skilled in the art, the first turn bar 52 could be positioned at any acute angle with respect to the vertical axis 56 and the second turn bar 54 could be positioned at any acute angle with respect to the vertical axis 56 so long as the sum of the acute angles equals 90°.

The inverting device 18 also includes a spacing roller 58 mounted between the first 52 and second 54 turn bars wherein the spacing roller 58 is positioned parallel with the vertical axis 56. A top bar 60 is positioned above the first 52 and second 54 turn bars intersecting the vertical axis 56. The top bar 60, turn bars 52, 54, and spacing roller 58 are all mounted to a common frame 62. A turn bar adjustment mechanism 64 is disposed on the frame 62 for adjusting the angles of the turn bars 52, 54, which adjusts the path of the second strip 40 passing around the turn bars 52, 54. The inverting device 18 further includes a bottom bar 66 positioned parallel to the top bar 60 and perpendicular to the vertical axis 56. Specifically, the bottom bar 66 is mounted below the frame 62. The top bar 60, turn bars 52, 54, spacing roller 58, and bottom bar 66 are metal cylinders or circular tubes with smooth exterior surfaces as are well known in the art. These cylinders are attached to the frame 62 at their distal ends wherein the second strip 40 may pass around the cylinders without any interference. In addition, these cylinders may or may not rotate and may or may not have an individual adjustment mechanism (not shown).

Figure 7:
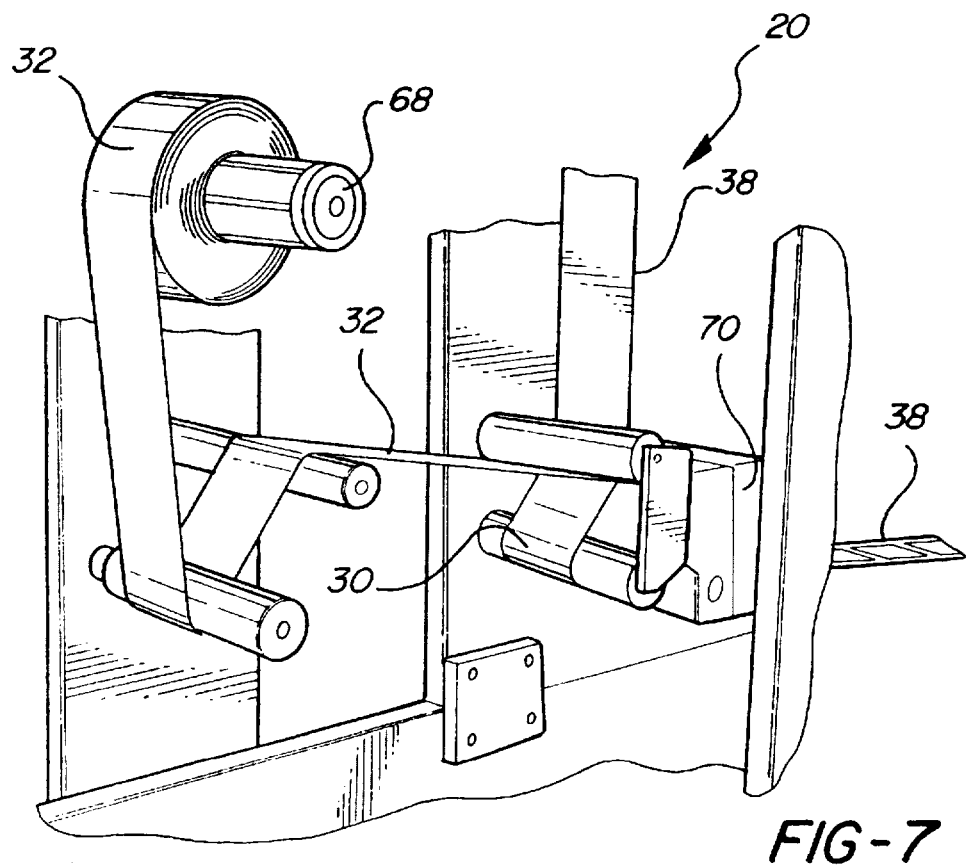
FIG. 7 is a fragmentary, perspective view of a stripping device.
Figure 8:
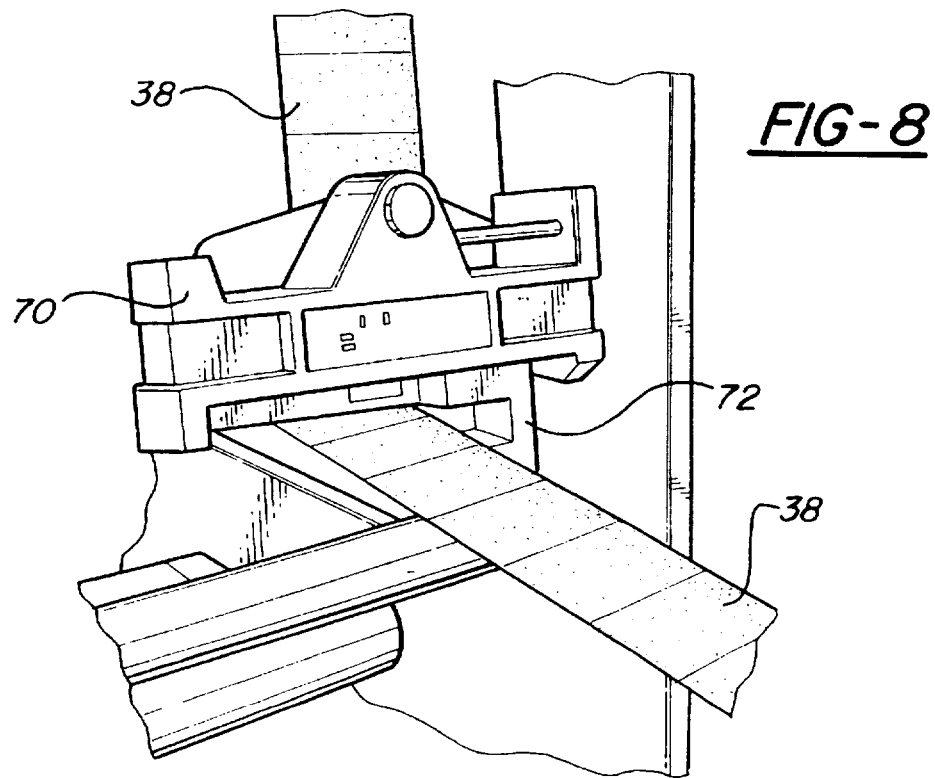
FIG. 8 is a fragmentary, perspective view of an electronic adjustment device.

The stripping device 20 is located within section C next to the inverting device 18. As best shown in FIG. 7, the stripping device 20 removes the release film 32 from the first strip 38 to expose the adhesive layer 30 of the first strip 38. The release film 32 is rolled onto a shaft 68. As one can appreciate, the release film 32 may be removed from the second strip 40 without deviating from the scope of the subject invention. Immediately after the release film 32 is removed, the first strip 38 passes through an electronic adjustment mechanism 70. As also shown in FIG. 8, the adjustment mechanism 70 comprises an electronic eye 72 that reads an edge off the strip 39 and makes any adjustments necessary. Such electronic adjustment mechanisms 70 are well known in the art and may be purchased from Mark Andy, Inc.

Figure 6:
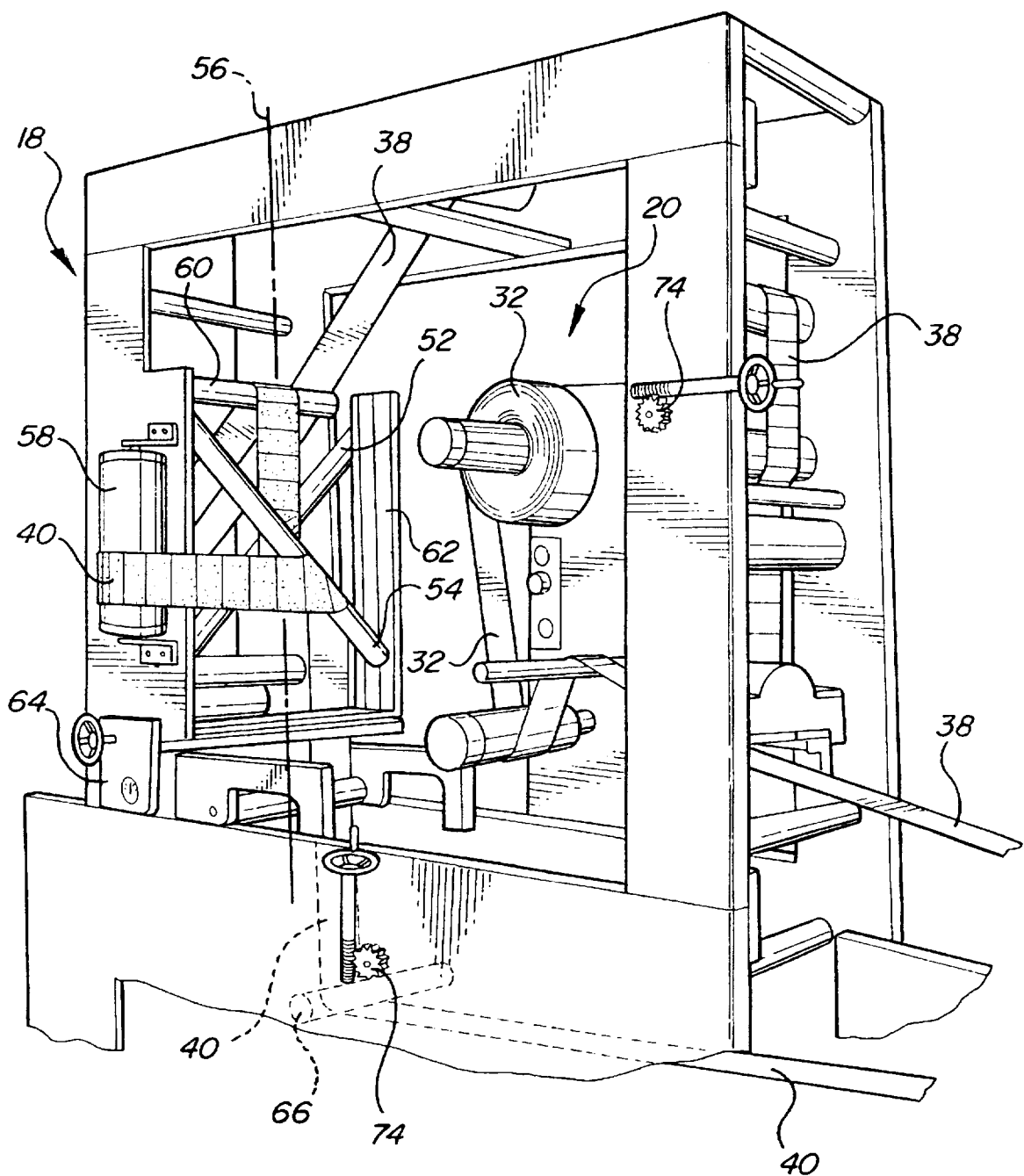
FIG. 6 is a fragmentary, perspective view of an inverting device.

Additional machine adjustment devices 74 are disposed along the longitudinal path for adjusting the first 38 and second 40 strips along the path. As shown in FIG. 6, these adjustment devices 74 are manually operated. However, any type of automatic or manual adjustment mechanism may be utilized without deviating from the scope of the subject invention.

Figure 9:
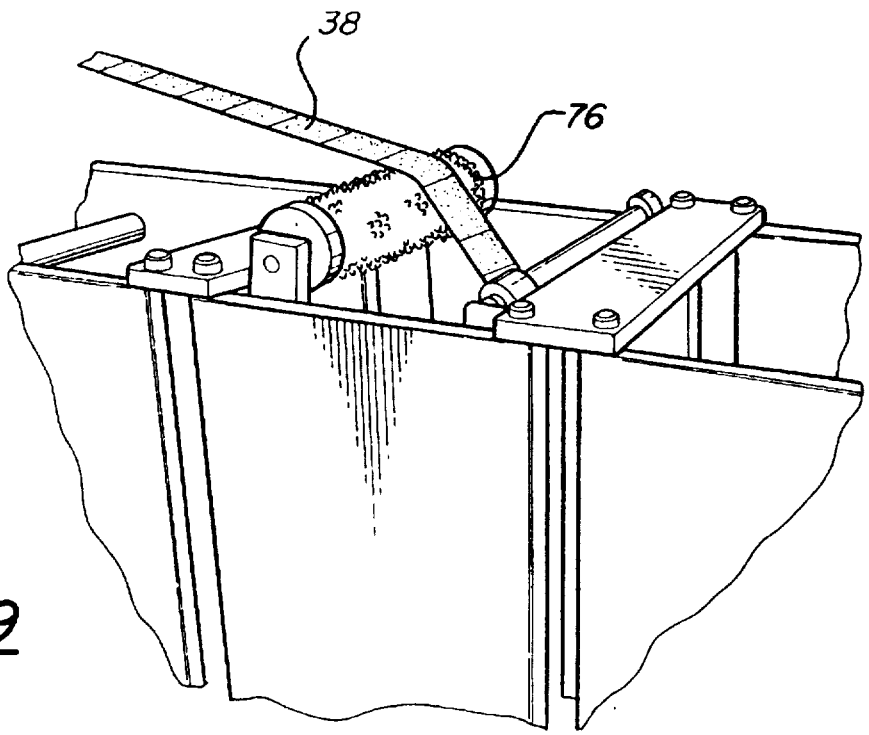
FIG. 9 is a fragmentary, perspective view of a non-stick roller.

The first 38 and second 40 strips then move into section D of the manufacturing machine assembly 10. As shown in FIG. 9, the first strip 38, which has the adhesive layer 30 exposed, passes over a nonstick roller 76 having a plurality of looped fibers adhered thereto whereby the adhesive layer 30 of the first strip 38 does not adhere to the roller 76. After the first strip 38 passes over the non-stick roller 76, the first 38 and second 40 strips should be aligned both horizontally and longitudinally. In other words, the printed indicia of the first strip 38 should align with the printed indicia of the second strip 40.

Figure 10:
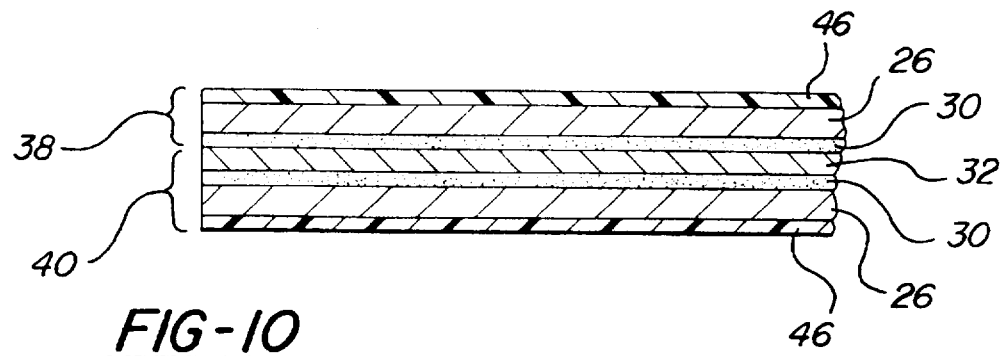
FIG. 10 is a fragmentary cross-sectional view taken along line 10—10 of FIG. 1.
Figure 11:
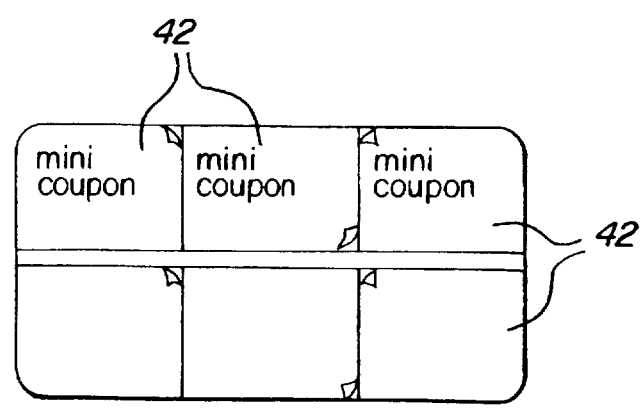
FIG. 11 is a bottom view taken along line 11—11 of FIG. 1.

The coupling device 22 mates and adheres the adhesive layer 30 of the first strip 38 with the release film 32 of the second strip 40 to form a series of two-sided coupon cards 78 with the indicia printed on both sides thereof. More specifically, the coupling device 22 includes a pair of oppositely disposed joining rollers 80 whereby the first 38 and second 40 strips interface at the joining rollers 80 to mate and adhere together. The continuous sheet of stock 26 having indicia printed on the top surface 36 in two parallel rows has been transformed into the continuous series of two-sided coupon cards 78. As best shown in FIG. 10, the laminate 46 of the first strip 38 is now a top surface of the coupon card 78 and the laminate 46 of the second strip 40 is now a bottom surface of the coupon card 78. In other words, the top surface, of the series of coupon cards 78, includes the first half 38 having the marketing information printed thereon and the bottom surface, of the series of coupon cards 78, includes the second half 40 having the mini-coupons 42 and other related information printed thereon. The bottom surface or second strip 40 is scored by a scoring wheel 82 to form the perimeter of the mini-coupons 42. The scoring is substantial enough such that the mini-coupons 42 may be removed without affecting the adhesion of the remaining mini-coupons 42. The scoring does not, however, sever the stock 26. As best shown in FIG. 11, the mini-coupons 42 may be individually pealed off upon redemption.

Figure 12:
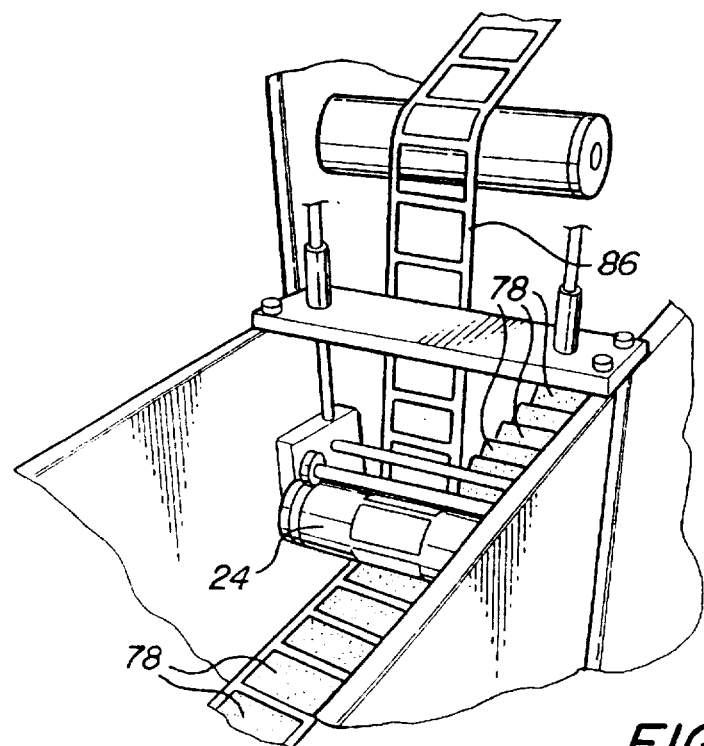
FIG. 12 is a fragmentary, perspective view of a punch wheel.
Figure 13:
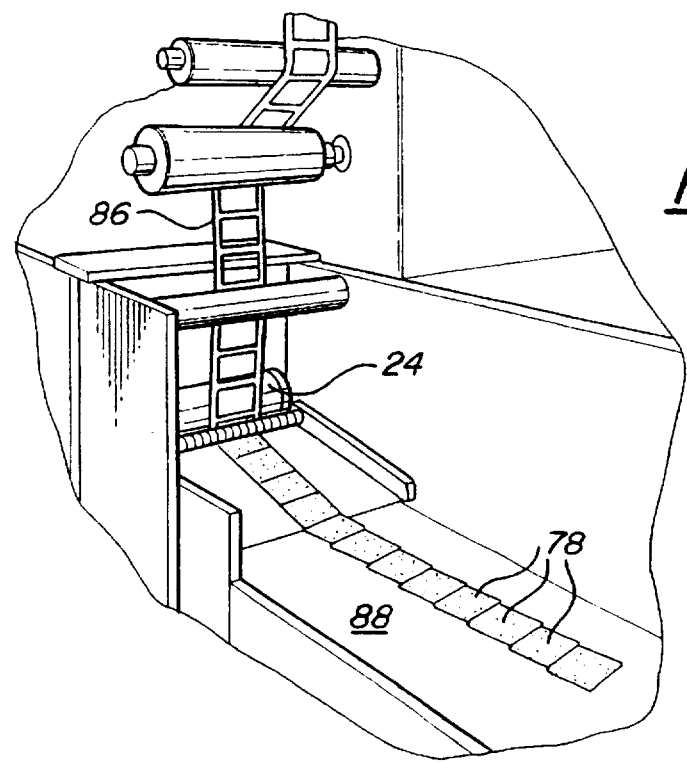
FIG. 13 is a fragmentary, perspective view of an exit shoot.

The series of two-sided coupon cards 78 passes under a punch wheel 24 for removing any exterior material 86 from the first 38 and second 40 strips. As shown in FIGS. 12 and 13, the punch wheel 24 removes all the exterior borders 86 from the series of coupon cards 78 and the two-sided coupon cards 78 accumulate along an exit shoot 88.

Accordingly, the manufacturing machine assembly 10 produces a series of two-sided coupon cards 78 fabricated from a continuous sheet of stock 26 having indicia printed on a top surface 36 and covered by a clear laminate 46 with an adhesive layer 30 and a release film 32 adhered to a bottom surface 34.

The method of manufacturing the series of two-sided coupon cards 78 comprises the following steps. First the rolled continuous sheet of stock 26, having the adhesive layer 30 and release film 32 adhered to the bottom surface 34, is fed into the printing station 12. The printing station 12 prints the indicia on the top surface 36 of the continuous sheet of stock 26 in two parallel rows which defines the first strip 38 and the second strip 40 of the stock 26 moving along the path. Then the clear laminate 46 is applied to the top surface 36 of the stock 26 for viewing the indicia. The continuous sheet of stock 26 is cut between the first 38 and second 40 strips to separate the first 38 and second 40 strips. One of the strips 38, 40 is rotated 180° relative to the other strip 40, 38 which moves the adhesive layer 30 of the first strip 38 into a bonded relationship with the release film 32 of the second strip 40. Specifically, the second strip 40 is rotated 180° relative to the first strip 38. The release film 32 is removed from the first strip 38 to expose the adhesive layer 30. The adhesive layer 30 of the first strip 38 is then mated with the release film 32 of the second strip 40 to form the series of two-sided coupon cards 78 with the indicia printed on both sides thereof.

The rotating of one of the strips 38, 40 is further defined by passing one of the strips 38, 40 through a first helical path to roll the one strip 38, 40 through a first portion of the 180° followed by passing the one strip 38, 40 through a second helical path to roll the one strip 38, 40 through a second portion of the 180° to effect the 180° rotation of the one strip 38, 40. In the preferred embodiment, the second strip 40 passes through the helical paths and is rotated 180° relative to the first strip 38. As stated above, the first strip 38 may be rotated 180° relative to the second strip 40 without deviating from the scope of the subject invention.

The first helical path is positioned about a first axis and the second helical path about a second axis which is disposed 90° relative to the first axis. The second strip 40 passes through the first portion of 90° and then through the second portion of 90°. More specifically, the second strip 40 passes from the first helical path through an intermediate cylindrical path to reverse the direction of the second strip 40 back to the second helical path. The overall movement of the strip 40 comprises passing the second strip 40 through a top cylindrical path and into the first helical path wherein the second strip 40 is juxtaposed with the first strip 38. The second strip 40 is rolled sideways and passes through the intermediate cylindrical path to reverse the direction of the second strip 40. The second strip 40 then passes into the second helical path and is rolled downward toward a bottom cylindrical path. The second strip 40 exits the bottom cylindrical path aligned with the first strip 38.

The first strip 38 passes continuously along the longitudinal path over the second strip 40 and the release film 32 is then removed therefrom. As stated above, the second strip 40 may have the release film 32 removed without deviating from the scope of the subject invention. Further, the path of the first strip 38 may travel along various routes so long as the first strip 38 eventually aligns with the second strip 40. In the preferred embodiment, the first strip 38 passes continuously along the longitudinal path and the second strip 40 passes out of the bottom cylindrical path to align the second strip 40 with the longitudinal path of the first strip 38. The first 38 and second 40 strips then move together to sandwich the adhesive layer 30 of the first strip 38 with the release film 32 of the second strip 40. Finally, the first 38 and second 40 strips are trimmed of any excess material after the first 38 and second 40 strips have mated together to form the series of two-sided coupon cards 78 with the indicia on both sides thereof.

An alternative embodiment is contemplated wherein the release film 32 of the second strip 40 is preprinted with a reverse or negative image. As discussed above, the second strip 40 is inverted and the laminate 46 of the second strip 40 becomes the bottom surface of the coupon card 78. The mini-coupons 42 are then formed from this bottom surface. As a user peals off the mini-coupons 42 an additional coupon or message begins to appear through the silicone finish, adhesive layer 30, and release film 32. The additional coupon or message has been inverted which allows a user to determine the meaning of the additional coupon or message.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of manufacturing a coupon card (78) fabricated from a continuous sheet of stock (26) having indicia printed on a top surface (36) and covered by a clear laminate (46) with an adhesive layer (30) and a release film (32) adhered to a bottom surface (34), the method comprising the steps of:

printing the indicia on the top surface (36) of the continuous sheet of stock (26) in two parallel rows that define a first strip (38) and a second strip (40) of the stock (26) moving along a path;

applying the clear laminate (46) to the top surface (36) of the stock (26) for viewing the indicia;

removing the release film (32) from the first strip (38) to expose the adhesive layer (30); and mating the adhesive layer (30) of the first strip (38) with the release film (32) of the second strip (40) to form a series of two-sided coupon cards (78) with the indicia printed on both sides thereof;

the method characterized by the mating being further defined as cutting the continuous sheet of stock (26) between the first (38) and second (40) strips to separate the first (38) and second (40) strips and rotating one of the first and second strips (38, 40) 180° relative to the other of the first and second strips (40, 38) and moving the adhesive layer (30) of the first strip (38) into a bonded relationship with the release film (32) of the second strip (40).

2. A method as set forth in claim 1 wherein the rotating of one of the strips (38,40) is further defined by passing one of the strips (38,40) through a first helical path to roll the one strip (38,40) through a first portion of the 180° followed by passing the one strip (38,40) through a second helical path to roll the one strip (38,40) through a second portion of the 180° to effect the 180° rotation of the one strip (38,40).

3. A method as set forth in claim 2 further defined as positioning the first helical path about a first axis and the second helical path about a second axis which is disposed 90° relative to the first axis.

4. A method as set forth in claim 3 further defined as passing the one strip (38,40) through the first portion of 90° and then through the second portion of b 90°.

5. A method as set forth in claim 4 including passing one of the strips (38,40) from the first helical path through an intermediate cylindrical path to reverse the direction of the one strip (38,40) back to second helical path.

6. A method as set forth in claim 5 including passing the other strip (40,38) continuously along a longitudinal path and passing the one strip (38,40) out of the second helical path to align the one strip (38,40) with the longitudinal path of the other strip (40,38).

7. A method as set forth in claim 6 further defined as passing the first strip (38) continuously along the longitudinal path and removing the release film (32) therefrom.

8. A method as set forth in claim 7 including moving the first (38) and second (40) strips together to sandwich the adhesive layer (30) of the first strip (38) with the release film (32) of the second strip (40).

9. A method as set forth in claim 8 including trimming material from the first (38) and second (40) strips after the first (38) and second (40) strips have mated together to form the series of two-sided coupon cards (78) with the indicia on both sides thereof.

10. A coupon manufacturing machine assembly (10) for producing a coupon card (78) fabricated from a continuous sheet of stock (26) having indicia printed on a top surface (36) and covered by a clear laminate (46) with an adhesive layer (30) and a release film (32) adhered to a bottom surface (34), said assembly (10) comprising:

a printing station (12) for printing said indicia on said top surface (36) of said continuous sheet of stock (26) in two parallel rows that define a first strip (38) and a second strip (40) of said stock (26) moving along a path;

a laminating device (14) for applying said clear laminate (46) to said top surface (36) of said stock (26) for viewing said indicia;

a stripping device (20) for removing said release film (32) from said first strip (38) to expose said adhesive layer (30);

a coupling device (22) for mating and adhering said adhesive layer (30) of said first strip (38) with said release film (32) of said second strip (40) to form a series of two-sided coupon cards (78) with said indicia printed on both sides thereof; and said assembly (10) characterized by a cutting device (16) for separating said continuous sheet of stock (26) into said first strip (38) and said second strip (40) and an inverting device (18) for rotating one of said first and second strips (38, 40) 180° relative to said others of said first and second strips (40, 38) and moving said adhesive layer (30) of said first strip (38) into a bonded relationship with said release film (32) of said second strip (40).

11. An assembly as set forth in claim 10 wherein said inverting device (18) further includes a first turn bar (52) and a second turn bar (54) with a vertical axis (56) passing through an intersection of the first (52) and second (54) turn bars.

12. An assembly as set forth in claim 11 wherein said first turn bar (52) is positioned at a first acute angle clockwise with respect to said vertical axis (56) and said second turn bar (54) is positioned at a second acute angle counterclockwise with respect to said vertical axis (56).

13. An assembly as set forth in claim 12 wherein the sums of said first and said second acute angles equals 90°.

14. An assembly as set forth in claim 13 wherein said first turn bar (52) is positioned at a 45° angle clockwise with respect to said vertical axis (56) and said second turn bar (54) is positioned at a 45° angle counterclockwise with respect to said vertical axis (56).

15. An assembly as set forth in claim 14 wherein said inverting device (18) further includes a spacing roller (58) mounted between said first (52) and second (54) turn bars.

16. An assembly as set forth in claim 15 wherein said spacing roller (58) is positioned parallel with said vertical axis (56).

17. An assembly as set forth in claim 16 wherein said inverting device (18) further includes a top bar (60) positioned above said first (52) and second (54) turn bars and intersecting said vertical axis (56).

18. An assembly is set forth in claim 17 including a common frame (62) wherein said top bar (60), said turn bars (52,54), and said spacing roller (58) are all mounted to said common frame (62).

19. An assembly as set forth in claim 18 wherein said common frame (62) further includes a turn bar adjustment mechanism (64) for adjusting said angles of said turn bars (52,54), which adjusts the path of said strip (38,40) passing around said turn bars (52,54).

20. An assembly as set forth in claim 19 wherein said inverting device (18) further includes a bottom bar (66).

21. An assembly as set forth in claim 20 wherein said bottom bar (66) is positioned parallel to said top bar (60) and perpendicular to said vertical axis (56).

22. An assembly as set forth in claim 21 wherein said cutting device (16) further includes an annular blade (48) anchored to a cutting wheel (50) whereby said sheet of stock (26) passes underneath said annular blade (48) and cuts said sheet of stock (26) between said first (38) and second (40) strips to separate said first (38) and second (40) strips.

23. An assembly as set forth in claim 22 including at least one machine adjustment device (74) disposed on said path for adjusting said first (38) and second (40) strips along said path.

24. An assembly as set forth in claim 23 including a non-stick roller (76) having a plurality of looped fibers adhered thereto whereby said adhesive layer (30) of said first strip (38) passes over said roller (76).

25. An assembly as set forth in claim 24 wherein said coupling device (22) further includes a pair of oppositely disposed joining rollers (80) whereby said first (38) and second (40) strips mate and adhere at said joining rollers (80).

26. An assembly as set forth in claim 25 including a punch wheel (24) for removing any exterior material (86) from said first (38) and second (40) strips after said first (38) and second (40) strips have mated together.

* * * * *